United States Patent [19]
Nerenberg

[11] Patent Number: 5,333,919
[45] Date of Patent: Aug. 2, 1994

[54] GASKET FOR A PIPE JOINT

[76] Inventor: Ron Nerenberg, Box 61, R. R. #1, Regina Saskatchewan, Canada, S4P 2X1

[21] Appl. No.: 114,924

[22] Filed: Sep. 2, 1993

[51] Int. Cl.⁵ .............................................. F16L 17/06
[52] U.S. Cl. ..................................... 285/363; 285/910
[58] Field of Search ....................... 285/368, 910, 363

[56] References Cited

U.S. PATENT DOCUMENTS

| 323,731 | 8/1885 | Phillips | 285/910 X |
| 2,269,486 | 1/1942 | Santoro | 285/910 X |
| 2,513,178 | 6/1950 | Jackson | 285/910 |
| 2,635,643 | 4/1953 | Hamer | 285/263 X |
| 3,524,662 | 8/1970 | Tolmon et al. | 285/368 |

FOREIGN PATENT DOCUMENTS

| 6891 | of 1887 | United Kingdom | 285/910 |
| 126244 | 5/1919 | United Kingdom | 285/368 |

*Primary Examiner*—Dave W. Arola
*Attorney, Agent, or Firm*—Adrian D. Battison; Murray E. Thrift; Stanley G. Ade

[57] ABSTRACT

A pipe joint is formed between two annular flanges at the end of pipe elements and includes a gasket in the form of an annular band having an outside diameter less than the bolts and an inside diameter equal to the diameter of the duct through the joint. The band is recessed on both surfaces from a shoulder spaced inwardly from the outer edge to the inner edge and these recessed portions are filling by annular bands of sealant material which is compressed in the finished joint.

1 Claim, 1 Drawing Sheet

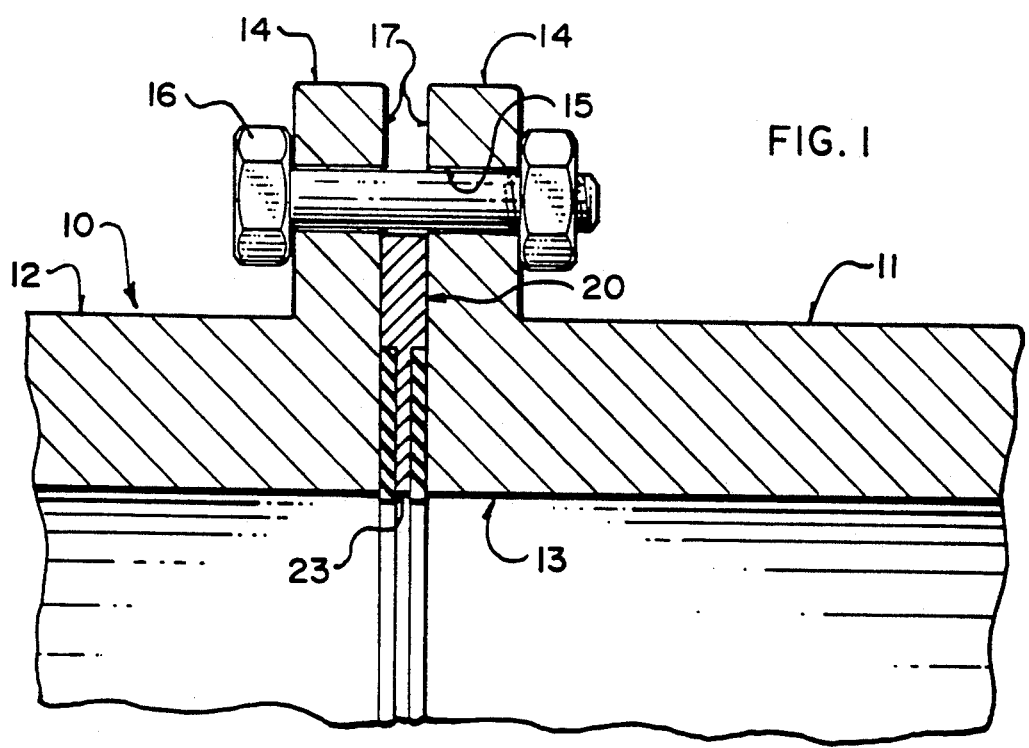
FIG. 1
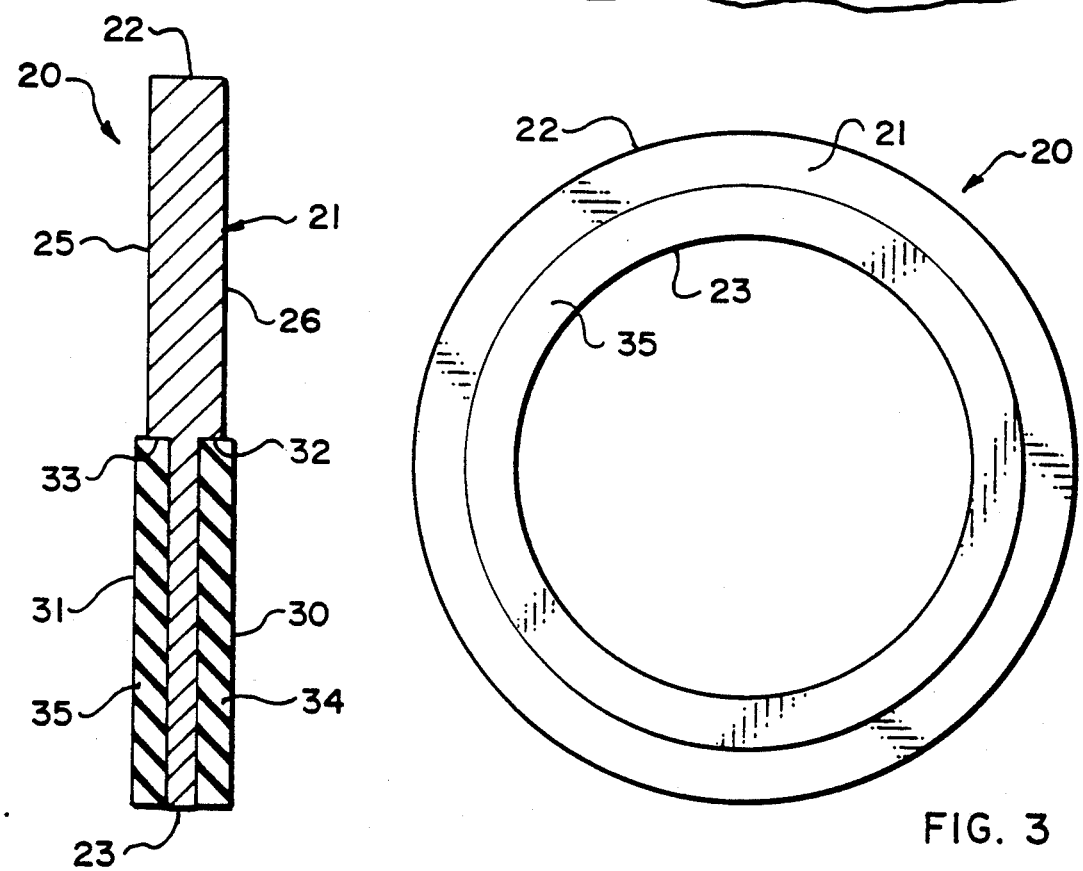
FIG. 2
FIG. 3

GASKET FOR A PIPE JOINT

BACKGROUND OF THE INVENTION

This invention relates to a pipe joint and particularly to an improved gasket for forming a pipe joint.

Pipe joints of the type which include two annular flanges surrounding the end of two pipe elements to be connected together are well known. Generally the annular flanges include a plurality of aligned bolt holes so the bolt fasteners can clamp the flanges together squeezing a gasket between the end faces of the flanges to provide a seal between the pipe elements. Such a joint can of course be formed between two pipe sections or between a pipe section and an adjacent valve, T-coupling or the like.

One type of gasket presently available on the marketplace is known as a "Flexotolic" gasket and this is formed of a number of layers of metal and fibrous material. This product is satisfactory when successfully installed but is however very fragile and it is sometimes necessary to make two or three attempts before a leak-proof connection is effectively installed.

One other technique which is currently available is to provide a formed in place gasket from a curable sealant material and this needs to be cured so it is not available for immediate use but needs a curing time before the pipes can be reused. Neoprene O-rings are also available but these have to be held in place with grooves in the pipe structure. Such O-rings can be dislodged and thus will cause leaking.

It is one object of the present invention, therefore, to provide an improved gasket for pipe joint of the above type.

SUMMARY OF THE INVENTION

According to the invention, therefore, there is provided a pipe joint comprising a first and second annular flange each surrounding a hollow cylindrical duct and each defining an end face with the end face of the first flange abutting the end face of the second flange to form a joint therebetween, a plurality of bolt fasteners at angularly spaced positions around the annular flange coupling the flanges together, and a gasket positioned between the end faces, the gasket comprising an annular band of metal defining a circular inside edge with a diameter at least equal to that of the hollow cylindrical duct, an outside circular edge, a first face abutting the end face of the first flange and a second face abutting the end face of the second flange, each of the first and second faces being recessed at a positioned spaced inwardly of the outer edge so as to define a recessed portion and a shoulder between the recessed portion and the outer edge and a layer of sealant material bonded to the recessed portion and carried thereby and compressed between the recessed portion and a respective end face of the first and second flanges.

Preferably the recessed portion extends from the shoulder to the inside edge. Preferably the gasket has an outside diameter less than that of the inside periphery of the bolts so that the gasket is free from perforations. The gasket is very stable, easily handled and easily installed and provides an effective seal by the compression of the sealant material. The sealing material is bonded to and carried by the recessed portions on either side of the annular gasket. The provision of the shoulder at the outside edge of the recessed portion prevents the sealant material from being forced outwardly beyond the shoulder and thus expelled from the joint.

The fact that the sealant material is carried by the gasket ensures that the gasket is a single unitary element readily handled and installed.

The sealant material can be formed from a gasket grade silicone, urethane, polyethylene plastic, neoprene oil-resistant rubber, nylon or teflon material all of which can be readily bonded to the recessed portions of the metal gasket.

The preassembled gasket is ready for use and immediately usable.

One embodiment of the invention will now be described in conjunction with the accompanying drawings in which:

DESCRIPTION OF THE DRAWINGS

FIG. 1 is a cross-sectional view through a joint according to the present invention.

FIG. 2 is a cross-sectional view showing a portion of the gasket prior to installation on an enlarged scale.

FIG. 3 is a frontal elevational view of the gasket of FIG. 2 on a smaller scale for convenience of illustration.

In the drawings like characters of reference indicate corresponding parts in the different figures.

DETAILED DESCRIPTION

The joint of the present invention is formed between two pipe elements 10 and 11 each of which includes a pipe wall 12 and an interior duct 13 of circular cylindrical cross-section. In the embodiment shown the pipe elements each form a pipe section but it is of course possible that one of the pipe elements may comprise a valve, a T-coupling or the like.

Each of the elements includes an annular surrounding flange 14 with a plurality of bolt holes 15 for receiving bolt fasteners 16 clamping the flanges together. Each flange includes an end face 17 facing the end face of the other flange so that the end faces effectively abut in the finished pipe joint.

The pipe joint is sealed by a gasket 20 comprising an annular metal band 21 having an outside edge 22 and an inside edge 23 both of which are circular, The annular band is relatively thin so its thickness between faces 25 and 26 is significantly less than the distance between the inside edge 23 and the outside edge 22.

The gasket is manufactured so that it is designed for the specific pipe joint concerned and thus the inside edge 23 has a diameter substantially equal to the diameter of the duct 13. The outside edge 22 has a diameter such that it sits just within the locus of the inside surfaces of the bolts 16. Thus the gasket is imperforate and plain.

The surfaces 25 and 26 are parallel and smooth for abutting the end faces 17 of the respective flanges.

Each of the surfaces 25 and 26 is machined to form a recessed section 30, 31 which extends from a shoulder 32, 33 to the inside edge 23. Thus the thickness of the annular band is reduced at the recessed portions 30 and 31. Onto the recessed portions is bonded two annular bands 34 and 35 of a sealing material of one of the types described hereinbefore. The band is bonded to the surface of the recessed portions so as to be attached thereto and carried thereby so the gasket is a single unitary element. The thickness of the sealant is substantially constant and is greater than the depth of the recessed portion so that the sealant material projects beyond the surfaces 25 and 26. The sealant extends from the shoulder to the inside edge, The dimensions of the gasket will of course vary in dependence upon the dimensions of the pipe to be joined. In one example the outside diameter of the gasket is of the order of 7.5 inches, the inside diameter of the gasket is of the order of 6.5 inches, each of the recessed portions has a width of 0.5 inches that is half the width of the gasket. The gasket has a thickness of the order of 2 millimeters, the recessed portions have a depth of the order of 0.5 millimeters and the thickness of the sealant material is 1.0 millimeters.

In the installed position shown in FIG. 1, the gasket is positioned between the inside surfaces of the bolts and the duct 13 and is compressed by the action of the bolts so that the end faces of the flanges clamp down onto the surfaces of the metal band. This acts to compress the sealant material so as to squeeze the material partly into the interior of the duct 13. The sealant material thus provides an effective seal and is prevented from being pressurized outwardly through the joint by the shoulders 32, 33.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A pipe joint comprising a first and second annular flange each surrounding a hollow cylindrical duct and each defining an end face with the end face of the first flange abutting the end face of the second flange to form a joint therebetween, a plurality of bolt fasteners at angularly spaced positions around the annular flange coupling the flanges together, and a gasket positioned between the end faces, the gasket comprising an annular band of metal defining a circular inside edge with a diameter at least equal to that of the hollow cylindrical duct, an circular outside edge, a first face abutting the end face of the first flange and a second face abutting the end face of the second flange, each of the first and second faces being recessed at a position spaced inwardly of the outside edge as to define a recessed portion and a shoulder between the recessed portion and the outside edge, the recessed portion extending from the shoulder inwardly to the circular inside edge and the shoulder being located inwardly of an outer edge of a respective end face of the first and second flanges so that those portions of the first and second faces of the gasket outside of the shoulders lie in contact with the respective one of the first and second end faces, and a layer of sealant material bonded to the recessed portion and carried thereby and extending at least to the inside edge and compressed between the recessed portion and the respective end face of the first and second flanges, the circular outside edge of the gasket having a diameter substantially equal to that of a locus of inside surfaces of the bolt fasteners so that the outside edge lies just within the locus of the inside surfaces of the bolt fasteners.

* * * * *